United States Patent
Jackson et al.

(10) Patent No.: US 10,920,095 B2
(45) Date of Patent: Feb. 16, 2021

(54) INK COMPOSITIONS

(71) Applicant: Hewlett-Packard Development Company, L.P., Spring, TX (US)

(72) Inventors: Milton Neill Jackson, Corvallis, OR (US); Jayprakash C. Bhatt, Corvallis, OR (US); Larrie Deardurff, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/497,027

(22) PCT Filed: Jul. 12, 2017

(86) PCT No.: PCT/US2017/041704
§ 371 (c)(1),
(2) Date: Sep. 24, 2019

(87) PCT Pub. No.: WO2019/013778
PCT Pub. Date: Jan. 17, 2019

(65) Prior Publication Data
US 2020/0017701 A1  Jan. 16, 2020

(51) Int. Cl.
*C09D 11/322* (2014.01)
*B41J 11/00* (2006.01)
(Continued)

(52) U.S. Cl.
CPC ......... *C09D 11/322* (2013.01); *B41J 11/0015* (2013.01); *B41M 5/0023* (2013.01);
(Continued)

(58) Field of Classification Search
CPC ....... C09D 11/54; C09D 11/30; C09D 11/102; C09D 11/107; C09D 11/322; C09D 11/36;
(Continued)

(56) References Cited

U.S. PATENT DOCUMENTS 6,734,231 B2  5/2004  Creusen et al.
6,908,185 B2  6/2005  Chen et al.
(Continued)

FOREIGN PATENT DOCUMENTS

EP      3124559       2/2017
WO     2008130625    10/2008
(Continued)

OTHER PUBLICATIONS

Cheng et al., Developing Smear-Free Pigmented Inks for Thermal Ink Jet (Abstract), NIP & Digital Fabrication Conference, 2000 International Conference on Digital Printing Technologies, Society for Imaging Science and Technology, 1 page.
(Continued)

*Primary Examiner* — Manish S Shah
(74) *Attorney, Agent, or Firm* — Thorpe North & Western LLP

(57) ABSTRACT

The present disclosure is drawn to ink compositions including an aqueous liquid vehicle, from 1 wt % to 9 wt % pigment dispersed in the aqueous liquid vehicle by a polymer dispersant associated with pigment, from 0.5 wt % to 5 wt % polymeric binder particles having an average particle size from 25 nm to 500 nm and a D10 particle size of 20 nm or more, and from 0.1 wt % to 1.5 wt % monovalent salt.

18 Claims, 4 Drawing Sheets

300 — dispersing a pigment with a polymer dispersant in an aqueous liquid vehicle — 310 dispersing polymeric binder particles in the aqueous liquid vehicle, wherein the polymeric binder particles have an average particle size from 25 nm to 500 nm and a D10 particle size of 20 nm or more — 320 adding a monovalent salt to the aqueous liquid vehicle, wherein the ink composition formed includes from 1 wt% to 9 wt% pigment, from 0.5 wt% to 5 wt% polymeric binder particles, and from 0.1 wt% to 1.5 wt% monovalent salt — 330

(51) Int. Cl.
   *B41M 5/00*    (2006.01)
   *C09D 11/033*  (2014.01)
   *C09D 11/037*  (2014.01)
   *C09D 11/102*  (2014.01)
   *C09D 11/38*   (2014.01)

(52) U.S. Cl.
   CPC .......... *C09D 11/033* (2013.01); *C09D 11/037* (2013.01); *C09D 11/102* (2013.01); *C09D 11/38* (2013.01)

(58) Field of Classification Search
   CPC ......... C09D 11/40; C09D 11/38; C09D 11/32; C09D 11/324; C09D 11/328; C09D 11/101; C09D 11/005; C09D 11/52; C09D 11/106; D06P 1/0032; D06P 1/0096; D06P 5/001; D06P 5/02; D06P 5/2011; D06P 5/2077; D06P 5/2083; D06P 5/30; B41J 3/4078; B41J 11/06; B41J 2/2117; B41J 2/2107; B41J 2202/03; B41J 2/04588; B41J 2/04595; B41J 2/04586; B41J 2/14274; B41J 2/01; B41J 2/211; B41J 2/1422; B41J 2/14; B41J 2/17593; B41J 2/1755; B41J 2/2114; B41J 2/2056; B41J 2/21; B41J 2/0057; B41J 3/60; B41J 2002/012; B41J 2/04598; B41J 2/1433; B41J 2/1623; B41J 2202/00; B41J 2/14201; B41J 2/045; B41J 11/0015; B41J 11/002; B41J 2/04581; B41J 2/055; B41J 2/16538; B41J 2002/16502; Y10T 428/24802; B41M 5/0011; B41M 5/0017; B41M 5/0023; B41M 5/0047; B41M 7/00; B41M 7/0072; B41M 5/52; B41M 5/5218; B41M 5/5227
   See application file for complete search history.

(56) References Cited

U.S. PATENT DOCUMENTS

| | | | |
|---|---|---|---|
| 8,815,979 B2 | 8/2014 | Roberts et al. | |
| 9,371,459 B2 | 6/2016 | Chevli et al. | |
| 9,487,657 B2 | 11/2016 | Johnson et al. | |
| 2002/0112644 A1* | 8/2002 | Nakamura | C09D 11/322 106/401 |
| 2003/0144375 A1* | 7/2003 | Wu | C09D 11/30 523/160 |
| 2005/0182154 A1* | 8/2005 | Berge | B41J 2/01 523/160 |
| 2008/0207811 A1* | 8/2008 | Brust | C09D 11/40 524/401 |
| 2008/0207820 A1* | 8/2008 | Brust | C09D 11/40 524/507 |
| 2009/0169748 A1* | 7/2009 | House | C09D 175/04 427/256 |
| 2009/0304925 A1* | 12/2009 | Berge | B41J 2/01 427/256 |
| 2010/0302292 A1 | 12/2010 | Dockery et al. | |
| 2012/0329921 A1* | 12/2012 | Vasudevan | C09D 11/324 524/104 |

FOREIGN PATENT DOCUMENTS

| | | |
|---|---|---|
| WO | 2011115614 | 9/2011 |
| WO | 2012148421 | 11/2012 |
| WO | 2013013024 | 1/2013 |
| WO | 2015177182 | 11/2015 |

OTHER PUBLICATIONS

Zhang et al., Synthesis of core-shell acrylic-polyurethane hybrid latex as binder of aqueous pigment inks for digital inkjet printing, Chinese Materials Research Society, Progress in Natural Science: Materials International, 2012, 22(1), pp. 71-78.
International Search Report dated Apr. 26, 2018 for PCT/US2017/041704, Applicant Hewlett-Packard Development Company, L.P.

\* cited by examiner

INK COMPOSITIONS

BACKGROUND

Color pigments are typically dispersed or suspended in a liquid vehicle to be utilized in inks. A variety of colored pigments are difficult to disperse and stabilize in water-based vehicles due to the nature of the surface of pigments and the self-assembling behavior of pigments. One way to facilitate color pigment dispersion and sustained suspension in a liquid vehicle is to add a dispersant, such as a polymer, to the liquid vehicle. The polymer stabilizes the dispersion and/or suspension of the pigments. Often, aqueous pigments based inks that are stabilized using polymer can penetrate print media resulting in low color saturation. Thus, enhancing color saturation of polymer dispersed pigments would be a desirable property to achieve generally.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology. It should be understood that the figures are representative examples of the present technology and should not be considered as limiting the scope of the technology.

DETAILED DESCRIPTION

Figure 1:
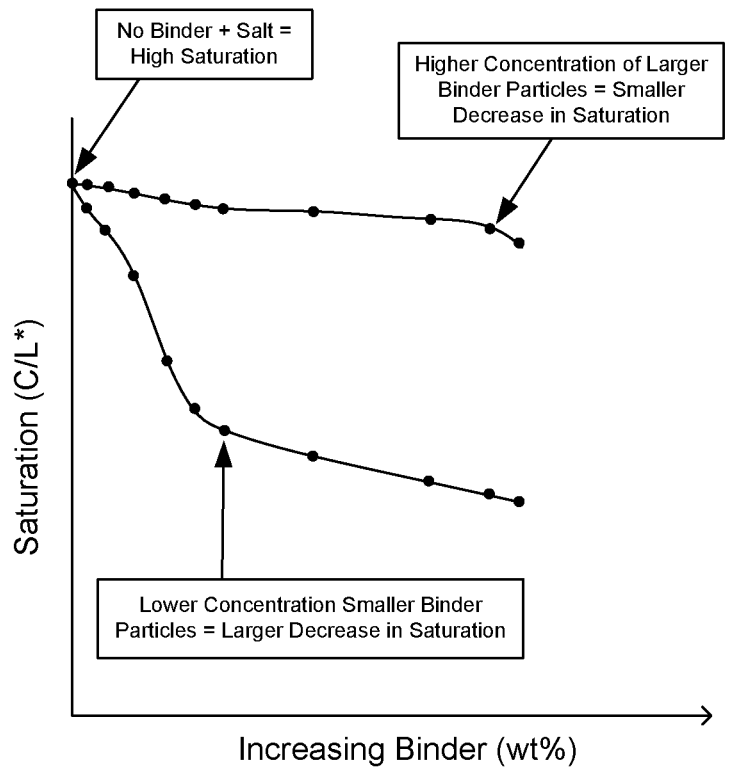
FIG. 1 graphically depicts example saturation trends in ink compositions containing pigment and monovalent salt, comparing the use of small polymeric binder particles vs. large polymeric binder particles.

Pigmented aqueous inks can exhibit low color saturation on porous media, such as plain paper or other media that is not designed to retain good color saturation. In order to increase color saturation, controlling charge stabilization using a small amount of monovalent salt can provide some improvement in this area, e.g., improving color saturation. However, when adding binder to improve durability, the color saturation tends to decrease, mitigating some or even most of the color saturation gains generated by the addition of the monovalent salt. This is particularly true with many traditional polymeric binder particles which tend to be small in size. However, by increasing the size of the polymeric binder particles generally, particularly at the low end of the particle size distribution, much of the color saturation gains provided by the addition of the salt can be retained. Thus, ink compositions can be prepared that not only have high saturation on plain paper or other porous absorptive media, but are also durable upon printing and drying on this type of media without the use of an added fusing step.

In one example of the present disclosure, an ink composition can include an aqueous liquid vehicle, and from 1 wt % to 9 wt % pigment dispersed in the aqueous liquid vehicle by a polymer dispersant associated with pigment. The ink composition can also include from 0.5 wt % to 5 wt % polymeric binder particles having an average particle size from 25 nm to 500 nm and a D10 particle size of 20 nm or more, and from 0.1 wt % to 1.5 wt % monovalent salt. Thus, in one example, the monovalent salt can be added to modify the charge stabilization of the dispersed pigment, and the polymeric binder particles can be added to improve the durability without significantly impacting the color saturation improvements generated by the addition of the monovalent salt.

In one example, the upper end of the particle size range can also be controlled to provide particle sizes that are suitable for reliable inkjet printing applications. For example, the particle count of polymeric binder particles that are greater than 500 nm can be less than 100,000,000 particles per mL of the ink composition. In another example, the size ratio of the polymeric binder particles to the pigment can also be controlled. For example, the size ratio of the polymeric binder particles to pigment can be from 0.25:1 to 1.5:1, based on the average particle size of each. In further detail, color pigment choice can also be considered with respect to the concentration of the polymeric pigment that is added. In one example, the pigment can be cyan, magenta, or yellow, and the polymeric binder particles can be present in the ink composition at from 0.5 wt % to 3 wt %. In another example, the pigment can be black, and the polymeric binder particles can be present in the ink composition at from 0.75 wt % to 2.5 wt %. Regarding the pigment and the monovalent salt content, in one example, the pigment to monovalent salt weight ratio in the ink composition can be from 5:1 to 25:1. In another example, the pigment can be included having a crash point at from 0.06 M to 0.3 M of the monovalent salt in the ink composition. In this example, the monovalent salt can be present at from 30% to 95% molar concentration of the crash point, for example, thus, providing conditions in the ink composition where the pigment is approaching its crash point (but is still stable in the ink composition prior to printing). Thus, the pigment can remain stable while in an inkjet fluid container, and when the ink composition is printed on a porous media substrate (e.g., plain paper), aqueous liquid vehicle can be absorbed into the porous media substrate. This can promote an increase in the ionic strength of the monovalent salt at a surface of the porous media substrate causing the pigment to crash at the surface of the porous media substrate. Thus, on the porous media substrate, the polymeric binder particles can bind the pigment to the porous media substrate. In still another detailed example, the pigment can be present at from 4.5 wt % to 8 wt %, the polymeric binder particles can be present at from 0.5 wt % to 3 wt %, and the monovalent salt concentration can be from 0.3 wt % to 0.8 wt %. Suitable polymeric binder particles can be provided from any polymer material having the particle size profiles described herein. However, in one example, the polymeric binder particles can include polyurethane, styrene acrylate, urethane acrylate, or a combination thereof.

In another example, a method of preparing an ink composition can include dispersing a pigment with a polymer dispersant in an aqueous liquid vehicle, and dispersing polymeric binder particles in the aqueous liquid vehicle. The polymeric binder particles can have an average particle size from 25 nm to 500 nm and a D10 particle size of 20 nm or more. The method can also include adding a monovalent salt to the aqueous liquid vehicle. Thus, when the ink composition is formed it can include from 1 wt % to 9 wt % pigment, from 0.5 wt % to 5 wt % polymeric binder particles, and from 0.1 wt % to 1.5 wt % monovalent salt. In one example, the particle count of polymeric binder particles greater than 500 nm can be less than 100,000,000 particles per mL of the ink composition. In another example, the polymeric binder particles and the pigment can have a size ratio from 0.25:1 to 1.5:1.

In another example, a method of printing can include inkjetting an ink composition from a fluid container through an inkjet printing orifice onto a porous media substrate. The ink composition can include an aqueous liquid vehicle, from 1 wt % to 9 wt % pigment dispersed in the aqueous liquid vehicle by a polymer dispersant associated with pigment, from 0.5 wt % to 5 wt % polymeric binder particles having an average particle size from 25 nm to 500 nm and a D10 particle size of 20 nm or more, and from 0.1 wt % to 1.5 wt % monovalent salt. The method can further include crashing the pigment at a surface of the porous media substrate. Thus, pigment can be stable while in the fluid container, and when the ink composition is printed on the porous media substrate, the aqueous liquid vehicle can be absorbed in the porous media substrate, thus increasing the ionic strength of the monovalent salt around the pigment surface (or in vicinity of the pigment particle), e.g., at a surface of the porous media substrate. This can cause the pigment to crash at the surface of the porous media substrate without the use of or contact with a separate crashing agent. Another step can include binding the pigment particles to a surface of the porous media substrate using the polymeric binder particles. In one specific example, the particle count of polymeric binder particles greater than 500 nm can be less than 100,000,000 particles per mL of the ink composition. Furthermore, the polymeric binder particles and the pigment can have a size ratio from 0.25:1 to 1.5:1.

As noted, the present disclosure is drawn to ink compositions, methods of making ink compositions, and methods of printing. In accordance with the present disclosure, a polymeric dispersant can be used to disperse or suspend color pigments that would otherwise clump together and settle out of the liquid vehicle. Polymers disperse the pigment by being adsorbed or otherwise attracted to the surface of the pigment particles. Two principal mechanisms of stabilization are steric stabilization and electrostatic stabilization. Steric stabilization occurs when the outer surface of a colored pigment becomes completely surrounded by polymer, thereby preventing individual pigments from clumping together. Electrostatic stabilization occurs when the outer surface of the pigment becomes essentially equally charged (or charged at least enough to remain suspended) in the suspension fluid. The equal charge on the outer surface of individual colored pigments results in a Coulomb-repulsion that prevents individual colored pigments from clumping together. The ink compositions and methods described herein provide for control of electrostatic stabilization of ink compositions by manipulating a concentration of an added monovalent salt, thereby allowing for the enhancement or increase of color saturation of the ink compositions when printed on plain, non-ColorLok® (HP, Inc.), print media. In accordance with this, the addition of a monovalent salt to a polymer dispersed pigmented ink can attenuate electrostatic stabilization. Thus, by controlling the concentration of monovalent salt, e.g., adding just enough to keep the dispersed pigment electrostatically stable without adding too much causing the pigment to crash, high color saturation, even on non-ColorLok® office media or plain paper, can be achieved.

However, in order to provide additional durability to images printed with such ink compositions, polymeric binder particles can be added. However, when polymeric binder particles are used that are relatively small, e.g., less than about 20 nm and/or small compared to the size of the pigment, the binder particles tend to become attracted or adsorbed to the pigment surface, thereby enhancing electrostatic and steric stability and thus reversing the saturation improvements achieved by the addition of the monovalent salt. On the other hand, by more carefully selecting or designing larger polymeric binder particles for use, the saturation improvements provided by the addition of the monovalent salt can be largely retained.

FIG. 1 graphically depicts the trend of how more traditional (small particle) polymeric binder particles can drastically impact color saturation in a negative manner, whereas, when using larger polymeric binder particles, the decrease in color saturation is much less pronounced and remains acceptable. In other words, by retaining the reduced pigment stabilization promoted by the presence of the monovalent salt, the pigment can be kept near its crash point prior to printing so that it will be more likely to remain at or near the surface of the porous media substrate when printed. Thus, at the surface of the porous media substrate, the polymeric binder particles can act to bind the pigment to a surface of the porous media substrate, e.g., plain paper.

Thus, in each of these examples, there are four components that can be used, or which can be formulated together, to generate inks with improved saturation or optical density and durability. These four components include the pigment, the dispersant, the monovalent salt, and the polymeric binder particles of the size profile described herein. The ionic strength of the monovalent salt that provides improved saturation will depend on the pigment and dispersant selected for use. The crash point can be determined experimentally by trial and error, or can be determined using colloidal vibrational current techniques described herein. In any event, the crash point for the pigment is not universal, but crash points can be readily determined as described herein, followed by formulating ink compositions, in one example, that include an ionic strength of monovalent salt that approaches the crash point, but does not exceed the crash point, e.g., from 30% to 95% of the crash point. Furthermore, by adding polymeric binder particles having an average particle size from 25 nm to 500 nm and a D10 particle size of 20 nm or more, durability can be enhanced without sacrificing more than a deminimis amount of color saturation.

Pigment crashing can occur when the stabilization forces, e.g., steric and electrostatic stabilization, do not provide enough stabilization to keep the pigments separated in space enough to prevent pigment crashing. This can cause the pigment to crash in on itself because there is not enough separation between particles. Thus, in the context of the present disclosure, "crash point" can be defined where a molar concentration (ionic strength) of a monovalent salt is just high enough that electrostatic stabilization provided by the polymer dispersant is unable to prevent the pigment from crashing. In other words, the crash point represents the molar concentration of the monovalent salt demarking the line between pigment stability and the pigment beginning to crash. In one example, the crash point of a pigment in an ink can be determined experimentally as described herein, e.g., trial and error or pigment colloidal vibrational current (CVI) techniques.

In accordance with this, by adding a monovalent salt at a concentration in an ink that brings the ionic strength (measured as the molar concentration of the added salt) just below the crash point, when the ink is printed on a porous media substrate, such as plain paper or non-ColorLok® paper, the liquid vehicle can absorb into the fibrous substrate, thus increasing the molar concentration or ionic strength of the monovalent salt around the pigment surface (or in vicinity of the pigment particle). Because the ionic strength of the monovalent salt was very close to the crash point for the pigment in the ink reservoir (prior to printing), once just a small portion of the liquid vehicle rapidly absorbs into the substrate, the pigment crashes at the surface thereof. Thus, much of the pigment remains at the surface when it crashes and the color saturation can be increased compared to inks that are otherwise identical, but which have less (or no) monovalent salt therein. With the pigment at the surface, to provide desired durability, the polymeric binder particles described herein can provide durability enhancement by protecting the surface printed pigment.

With specific reference to the pigment, the pigment is not particularly limited. The particular pigment used will depend on the colorist's desires in creating the composition. Pigment colorants can include cyan, magenta, yellow, black, red, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), nitropigments, nitroso pigments, anthanthrone pigments such as PR168, and the like. Representative examples of phthalocyanine blues and greens include copper phthalocyanine blue, copper phthalocyanine green and derivatives thereof such as Pigment Blue 15, Pigment Blue 15:3, and Pigment Green 36. Representative examples of quinacridones include Pigment Orange 48, Pigment Orange 49, Pigment Red 122, Pigment Red 192, Pigment Red 202, Pigment Red 206, Pigment Red 209, Pigment Violet 19, and Pigment Violet 42. Representative examples of anthraquinones include Pigment Red 43, Pigment Red 194, Pigment Red 177, Pigment Red 216, and Pigment Red 226. Representative examples of perylenes include Pigment Red 123, Pigment Red 190, Pigment Red 189, and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Other pigments that can be used include Pigment Blue 15:3, DIC-QA Magenta Pigment, Pigment Red 150, and Pigment Yellow 74. Such pigments are commercially available in powder, press cake, or dispersions form from a number of sources.

If desired, two or more pigments can be combined to create novel color compositions, but the polymer dispersant to pigment weight ratio and the total pigment load may be considered based on the entire pigment load (cumulative based on all pigments). In one example, a pigment combination can form a red ink by combining a magenta pigment and a yellow pigment, e.g. 50-60 wt % magenta pigment and 40-50 wt % yellow pigment. In another example, the pigment combination can form a green ink by combining a yellow pigment and a cyan pigment, e.g., 65-75 wt % yellow pigment and 25-35 wt % cyan pigment. In yet another example, the pigment combination can form a blue ink by combining cyan pigment and magenta pigment, e.g., 85-95 wt % cyan pigment and 5-15 wt % magenta pigment.

The pigments of the present disclosure can be from nanometers to a micron in size, e.g., 20 nm to 1 µm. In one example the pigment can be from about 50 nm to about 500 nm in size. Pigment sizes outside this range can be used if the pigment can remain dispersed and provide adequate printing properties.

The pigment load in the ink compositions can range from 1 wt % to 9 wt %. In other examples, the pigment load can be from 2 wt % to 9 wt %, from 3 wt % to 9 wt %, from 3 wt % to 7 wt %, or from 5 wt % to 9 wt %. In a further example, the pigment load can be from 4 wt % to 6 wt %, or from 6 wt % to 8 wt %

With specific reference to the polymeric dispersant in each of these examples, this component can be any suitable polymeric dispersant known in the art that is sufficient to form an attraction with the pigment particles. The polymeric dispersant should not be confused with the polymeric binder particles, as these polymers are separate components. The polymeric dispersant can include acid groups, and/or includes both hydrophilic moieties and hydrophobic moieties. In one example, the dispersant may have an acid number ranging from 40 to 180. The ratio of hydrophilic moieties to the hydrophobic moieties can range widely, but in certain specific examples, the weight ratios can be from about 1:5 to about 5:1. In another example, the ratio of hydrophilic moieties to the hydrophobic moieties can range from about 1:3 to about 3:1. In yet another example, the ratio of hydrophilic moieties to the hydrophobic moieties can range from about 1:2 to about 2:1. In one example, the polymeric dispersant can include a hydrophilic end and a hydrophobic end. The polymer can be a random copolymer or a block copolymer or a graft polymer (comb polymer).

The particular polymeric dispersant can vary based on the pigment; however, as mentioned, the hydrophilic moieties typically include acid groups. Some suitable acid monomers for the polymeric dispersant include acrylic acid, methacrylic acid, carboxylic acid, sulfonic acid, phosphonic acid, and combinations of these monomers. The hydrophobic monomers can be any hydrophobic monomer that is suitable for use, but in one example, the hydrophobic monomer can be styrene. Other suitable hydrophobic monomers can include isocyanate monomers, aliphatic alcohols, aromatic alcohols, diols, polyols, or the like, for example. In one specific example, the polymeric dispersant includes polymerized monomers of styrene and acrylic acid at a 5:1 to 1:5 weight ratio.

The weight average molecular weight (Mw) of the polymeric dispersant can vary to some degree, but in one example, the weight average molecular weight of the polymeric dispersant can range from about 5,000 Mw to about 20,000 Mw. In another example, the weight average molecular weight can range from about 7,000 Mw to about 12,000 Mw. In another example, the weight average molecular weight ranges from about 5,000 Mw to about 15,000 Mw. In yet another example, the weight average molecular weight ranges from about 8,000 Mw to about 10,000 Mw.

Turning now to the polymeric binder particles (which are different than the polymeric dispersant described above), these particles can be any polymeric material that can act to bind pigment to a media substrate upon printing. In one example, the polymeric binder particles can include a polyurethane. Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a copolymer thereof, and a combination thereof. In one specific example, the polymeric binder particles can include a urethane acrylate. In another example, the polymeric binder particles can include a styrene acrylate. In another example, the polymeric binder can be a polystyrene latex.

The polymeric binder particles can be prepared to have any of a number of different morphologies. For example, the polymer may be a homopolymer prepared from a single monomer. Alternatively, the polymeric binder particles may be individual spherical particles containing polymer compositions of high Tg hydrophilic (hard) component(s) and/or low Tg hydrophobic (soft) component(s) that may be interdispersed according to IPN (interpenetrating networks), although it is contemplated that the high Tg hydrophilic and Tg hydrophobic components may be interdispersed in other ways. For another example, the polymer particles may be made of a low Tg hydrophobic core surrounded by a continuous or discontinuous high Tg hydrophilic shell. For another example, the polymer particle morphology may resemble a raspberry, in which a low Tg hydrophobic core is surrounded by several smaller high Tg hydrophilic particles that are attached to the core. For still another example, the polymer particles may include 2, 3, or 4 particles that are at least partially attached to one another.

In examples herein, high Tg hydrophilic component(s)/shell/particles and low Tg hydrophilic component(s)/core/particles may be defined in relation to each other (e.g., the high Tg hydrophilic component(s)/shell/particles have a Tg higher than the low Tg hydrophilic component(s)/core/particles, and the low Tg hydrophilic component(s)/core/particles have a Tg lower than the high Tg hydrophilic component(s)/shell/particles). In some examples, the high Tg hydrophilic component(s)/shell/particles have a Tg higher than 25° C. In other examples, the high Tg hydrophilic component(s)/shell/particles have a Tg higher than 45° C. In some examples, the low Tg hydrophilic component(s)/core/particles have a Tg lower than 25° C. In other examples, the low Tg hydrophilic component(s)/core/particles can have a Tg lower than 5° C.

The copolymers may likewise may include a more hydrophobic component and a more hydrophilic component. In these examples, the hydrophilic component renders the particles dispersible in the ink vehicle, while the hydrophobic component is capable of coalescing upon solvent evaporation to bind the pigment on a recording medium. Examples of low Tg monomers that may be used to form a hydrophobic component of a copolymer include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The copolymer can be formed of at least two of the previously listed monomers, or at least one of the previously listed monomers and a high Tg hydrophilic monomer, such as an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high Tg hydrophilic monomers include acrylamide, methacrylamide, monohydroxylated monomers, monoethoxylated monomers, polyhydroxylated monomers, or polyethoxylated monomers.

In the copolymers disclosed herein, the low Tg hydrophobic component(s) can make up from about 65% to about 100%, by weight, of the polymer, and the high Tg hydrophilic component(s) make up from about 0.1% to about 35%, by weight, of the polymer.

Any suitable polymerization process may be used to form the polymeric binder particles of the present disclosure, provided the particles formed meet the size criteria described herein. For example, hydrophobic-hydrophilic polymer particles can be formed by any of a number of techniques, such as: i) attaching a high Tg hydrophilic polymer onto the surface of a low Tg hydrophobic polymer, ii) copolymerizing low Tg hydrophobic and high Tg hydrophilic monomers using ratios that lead to a more high Tg hydrophilic outer component or shell, iii) adding high Tg hydrophilic monomer (or excess high Tg hydrophilic monomer) toward the end of the copolymerization process so there is a higher concentration of high Tg hydrophilic monomer copolymerized at or near the surface, or iv) any other method known in the art to generate a more high Tg hydrophilic outer component or shell relative to the inner component or core. These hydrophobic-hydrophilic polymer particles may be core-shell particles. It is to be understood, however, that these techniques may also form polymer particles with other morphologies, as noted herein.

In further detail, the polymeric binder particles can have an average particle size from 25 nm to 500 nm, from 25 nm to 250 nm, from 25 nm to 100 nm, from 30 nm to 250 nm, from 30 nm to 100 nm, from 40 nm to 250 nm, from 40 nm to 100 nm, or from 50 nm to 100 nm, for example. As used herein, "average" with respect to properties of particles refers to a number average unless otherwise specified. Accordingly, "average particle size" refers to a number average particle size. Additionally, "particle size" refers to the diameter of spherical particles or to the longest dimension of non-spherical particles.

In further detail, and in accordance with certain specific examples, the particle size distribution of the polymeric binder particles can further be defined based on the tenth-percentile by weight of the particles that are below a given particle size, also referred to herein as D10. Likewise, other "percentiles" by weight of the particles that are below a given particle size can be used to further characterize particle size distribution, e.g., D50, D90, etc. Thus, D50 can be defined as the fiftieth-percentile by weight of particles that are below a given particle size, and D90 can be defined as the ninetieth-percentile by weight of particles that are below a given particle size. For example, in accordance with examples of the present disclosure, polymeric binder particles having an average particle size from 25 nm to 500 nm refers to the number average particle size of all of the particles; and a D10 particle size of 20 nm or more refers to the tenth-percentile by weight of the particles including all particles up to 20 nm (or more). Thus, as the D10 particle size increases, the trend of fewer small particles typically follows, assuming a bell shaped or normal distribution of particles. If the distribution of particles is other than normal or bell shaped, still the tenth-percentile by weight of particles includes particle sizes only up to D10 particle size value. In one example, the D10 particle size value can be 20 nm or more, 25 nm or more, 30 nm or more, 40 nm or more, 50 nm or more, 75 nm or more, or 100 nm or more. The upper limit of the D10 particle size value can be 50 nm, 100 nm, 150 nm, or 200 nm, for example. The D50 particle size value can be 30 nm or more, 35 nm or more, 40 nm or more, 50 nm or more 75 nm or more, 100 nm or more, or 200 nm or more. The upper limit of the D50 particle size value can be 75 nm, 100 nm, 150 nm, 250 nm, or 350 nm, for example. In another example, the D90 particle size value can be 60 nm or more, or 70 nm or more, or 100 nm or more, or 150 nm or more. The upper limit of the D90 particle size value can be 100 nm, 150 nm, 250 nm, 350 nm, or 450 nm, for example. In accordance with examples of the present disclosure, the D10 particle size value is less than the D50 particle size value which is less than the D90 particle size value. To illustrate, in one example, the D10 particle size value can be 20 nm or more, the D50 particle size value can be 30 nm or more, and the D90 particle size value can be 70 nm or more. In further detail, in one example, the D10, D50, and D90 particle sizes can all be less than 100 nm. That being stated, any combination of the D10 particle size values, the D50 particle size values, and the D90 particle size values described herein can be used. Typically, the D10 particle size value can be smaller than the D50 particle size value, which can be smaller than the D90 particle size. In other examples by way of illustration, the D10 particle size value can be 30 nm or more, the D50 particle size value can be 50 nm or more, and the D90 particle size value can be 100 nm or more; of the D10 particle size value can be 50 nm or more, the D50 particle size value can be 100 nm or more, and the D90 particle size value can be 150 nm or more, and so forth. Upper end limits for these particle size distributions can be any upper limit described herein which is greater than the lower limit enumerated.

In addition to the particle size distribution values provided by the D10 value, the D50 value, D90 value, etc., total polymeric binder particle count above 500 nm in 1 mL of ink can also be kept relatively low to avoid printability problems from inkjet printing architecture, such thermal inkjet printing nozzles and the like. In one example, the particle count of polymeric binder particles that are greater than 500 nm can be less than 100,000,000 particles per mL of the ink composition. In another example, the polymeric binder particles that are greater than 500 nm can be less than 10,000,000 particles per mL of the ink composition. In another example, the polymeric binder particles that are greater than 400 nm can be less than 100,000,000 particles per mL of the ink composition. In another example, the polymeric binder particles that are greater than 400 nm can be less than 10,000,000 particles per mL of the ink composition.

Figure 2:
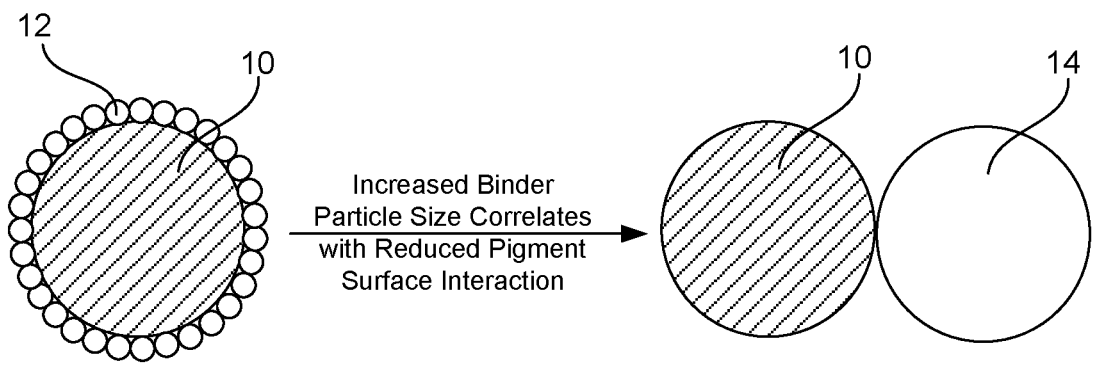
FIG. 2 compares example surface interactions between pigment and small polymeric binder particles and larger polymeric binder particles.

The polymeric binder particles and the pigment (particles) can be prepared or selected so that they are reasonably similar in size. As mentioned previously, the use of smaller, traditionally sized, polymeric binder particles can be undesirable because it can lead to reduced saturation when printed on plain paper and other porous types of media. Larger particles do not have such a big impact on color saturation in these types of ink compositions. In further detail, controlling the size ratio of the polymeric binder particles to pigment can also provide improved performance. FIG. 2 shows a simplified schematic illustrating the differences in particle interactions between the pigment 10 and various sizes of polymeric binder particles. Specifically, when the particle size of the polymeric binder particles 12 are very small relative to the particle size of pigment, there is more surface interaction. On the other hand, when the particle size of the polymeric binder particles 14 are larger compared to the particle size of the pigment, there is less surface interaction and thus, a lower propensity to modify the pigment stability (or lack thereof) in the ink that is provided by the monovalent salt to improve saturation. When the size ratio is closer to 1:1 (as opposed to 10:1, for example), the association of the polymeric binder particle (generally) with the pigment particle is not as strong and does not tend to provide additional unwanted dispersability of the pigment particle. In other words, the pigment is not significantly stabilized away from its crash point by the presence of the larger polymeric binder particles, mitigating the saturation improving effect provided by the monovalent salt (which is added to cause the pigment to approach the crash point and improve saturation). In FIG. 2, the average particle size ratio of the larger polymeric pigment particles 14 to the pigment particles is shown to be at about 1:1. However, in examples of the present disclosure, the (number average) particle size ratio of the polymeric binder particles to the pigment (particles) can be from 0.25:1 to 1.5:1, from 0.5:1 to 1.3:1, from 0.75:1 to 1.2:1, or about 1:1, though ranges other than those listed can also be used.

In further detail, different concentrations of polymeric binder particles can be used based on the ink formulation ingredients, ink color, or other ink properties. In further detail, color pigment choice can also be considered with respect to the concentration of the polymeric pigment that is added. In one example, the pigment can be cyan, magenta, or yellow, and the polymeric binder particles can be present in the ink composition at from 0.5 wt % to 3 wt %, or from 0.75 wt % to 2.5 wt %. In another example, when the pigment is cyan, the polymeric binder particles can be present in the ink composition at from 0.5 wt % to 2 wt %. In another example, when the pigment is yellow, the polymeric binder particles can be present in the ink composition at from 0.5 wt % to 2 wt %. In still another example, when the pigment is magenta, the polymeric binder particles can be present in the ink composition at from 1 wt % to 3 wt %. In still another example, when the pigment is black, the polymeric binder particles can be present in the ink composition at from 0.75 wt % to 2.50 wt %. Weight ratios outside of these ranges can also be used. These polymeric binder particle ranges can be expanded or narrowed based on various considerations, but in general, the polymeric polymer particles can be more generally present in the ink composition at from 0.5 wt % to 5 wt %.

Turning now to the monovalent salt, any of a number of salts (including monovalent alkali metal salts, monovalent non-metallic salts, or combinations thereof) can be used. Examples of monovalent non-metallic salts can include monovalent quaternary ammonium salts [$NR^{+4}$], where R is an alkyl group or an aryl group organic salts), e.g., $NH_4F$, $NH_4Cl$, $NH_4NO_3$, $(NH_4)_2SO_4$, and/or $(NH_4)_3PO_4$. Examples of monovalent alkali metal salts that can be used include LiF, NaF, KF, RbF, CsF, LiCl, KCl, NaCl, CsCl, RbCl, LiBr, CsBr, RbBr, KBr, NaBr, $NH_4Br$, LiI, NaI, KI, RbI, CsI, $NaNO_3$, $KNO_3$, $LiNO_3$, $RbNO_3$, $CsNO_3$, $KNO_3$, $Li_2SO_4$, $Na_2SO_4$, $K_2SO_4$, $Cs_2SO_4$, $Rb_2SO_4$, $Li_3PO_4$, $Na_3PO_4$, $K_3PO_4$, $Rb_3PO_4$, $Cs_3PO_4$, $Li_3PO_4$, monosodium citrate, disodium citrate, trisodium citrate, potassium citrate, rubidium citrate, cesium citrate, lithium citrate, sodium ascorbate, potassium ascorbate, lithium ascorbate, lithium acetate, sodium acetate, potassium acetate, cesium acetate, rubidium acetate, monosodium glutamate, and/or potassium glutamate. Essentially, any salt that includes a monovalent alkali metal cation or a monovalent non-metallic cation (ionically associated at one or more location to an anion) can be used.

The monovalent salts can be present in the ink compositions at from 0.1 wt % to 1.5 wt %. Typically, 1.2 wt % monovalent salt provides an acceptable upper limit of salt content. However, using only weight percentages to establish the monovalent salt concentration, in some cases, may not provide a detailed or specific enough range or concentration for each and every one of these monovalent salts that may be used. For example, as the polymeric binder particles can contribute to some additional stabilization of the pigment in the ink (even with larger particles), a slightly higher salt content can be used in some instances, e.g., up to 1.5 wt %, to compensate for the additional stability that can be provided by the presence of the polymeric binder particles. That being stated, to establish generalized ranges, the salt can more typically be present in the ink at from 0.1 wt % to 1.5 wt %, 0.25 wt % to 1.2 wt %, 0.3 wt % to 1 wt %, or from 0.3 wt % to 0.8 wt %.

These weight ranges are provided primarily for guidance and to emphasize that the range of salt used is typically low, but above at least a minimum threshold of 0.25 wt % to generate improved saturation. When combining specific pigments and specific monovalent salts, ionic strength based on molar concentration can be further used to provide more specific range information where color saturation may be improved further. For example, the molar concentration of the monovalent salt can be from 30% to 95% of the crash point, or from 50% to 90% of the crash point, or from 60% to 85% of the crash point. As mentioned above, the "crash point" can be defined by a molar concentration of the monovalent salt where its ionic strength in the ink is just high enough that electrostatic stabilization provided by the dispersant is not strong enough to prevent the pigment from crashing. In accordance with this, depending on the pigment and monovalent salt selected, the crash point of the pigment may be at a molar concentration of monovalent salt from 0.06 M to 0.3 M, or from 0.1 M to 0.25 M. In other more specific examples, for magenta or yellow pigment, the crash point may be at a molar concentration of monovalent salt of 0.08 M to 0.22 M or from 0.12 M to 0.18 M; and/or for cyan ink, the crash point may be at a molar concentration of monovalent salt of 0.12 M to 0.29 M or from 0.15 M to 0.25 M. Ink compositions with mixtures of pigments used for other colors, e.g., Red, Blue, Green, Purple, Pink, Orange, etc., can be adjusted so that neither pigment reaches its crash point in one example.

One reason crash point is defined based on ionic strength rather than by weight percentage has to do, in part, with the varying molecular weights of the monovalent salts that can be used. That being stated, a weight range from about 0.25 wt % to about 1.5 wt % for the monovalent salt concentration in the ink may be suitably broad enough to cover various pigment and monovalent salt concentrations that are possible. In further detail, some pigments and monovalent salt concentrations may provide crash points that are close to either end of the 0.25 wt % or 1.5 wt % monovalent salt concentration range. To illustrate, monovalent salt concentrations typically below about 0.25 wt % may only provide minimal saturation improvement, even with monovalent salts that are relatively molecularly light, e.g., NaCl, KCl, NaF, KF, etc. Thus, concentrations of 0.25 wt % or more tend to provide more noticeable saturation improvement (but may cause crashing at lower weight percentages). On the other hand, though monovalent salt concentrations above about 1.5 wt % are typically more than enough to crash most pigments (which is undesirable while in the ink reservoir), for salts having a heavier molecular weight, e.g., CsBr, RbI, $Cs_2SO_4$, $Rb_2SO_4$, etc., but which may provide a similar ionic strength as lighter monovalent salts that may alternatively be included at lower weight percentages, monovalent salt concentrations approaching the 1.5 wt % upper limit may be suitable for use (where a lighter molecular weight monovalent salt with similar ionic properties may cause crashing at a lower weight percentage in the ink composition). For example, a heavy monovalent salt may not provide as much ionic strength per weight percent as a lighter monovalent salt, so a higher weight percentage of the heavier monovalent could be used to formulate an ink having an ionic strength close to the crash point. Likewise, if a heavier monovalent salt is used, 0.1 wt % of the monovalent salt may not provide enough ionic strength to achieve improved color saturation or black optical density, depending in part on the ink formulation density.

In accordance with this, with respect to the monovalent salt, it is noted that weight percentage ranges, e.g., 0.1 wt % to 1.5 wt %, 0.25 wt % to 1.2 wt %, 0.3 wt % to 1 wt %, from 0.3 wt % to 0.8 wt %, etc., and ionic strength ranges, e.g., 0.06 M to 0.3 M, 0.1 M to 0.25 M, 0.08 M to 0.22 M, 0.12 M to 0.18 M, 0.12 M to 0.29 M, 0.15 M to 0.25 M, etc., can be combined together in any combination to provide a monovalent salt concentration profile that is desired for an ink composition to enhance color saturation or optical density. Again, when designing such an ink, the ionic strength of the monovalent salt may also be less than the crash point of the specific pigment/monovalent salt selected for use in the ink composition, e.g., from 30% to 95%, 50% to 90%, 60% to 85%, etc., of the ionic strength of the pigment crash point. Furthermore, pigment concentration ranges, e.g., 1 wt % to 9 wt %, 2 wt % to 9 wt %, 3 wt % to 9 wt %, 3 wt % to 7 wt %, 5 wt % to 9 wt %, 4 wt % to 6 wt %, 6 wt % to 8 wt %, etc., and/or pigment to monovalent salt ratio, e.g., 5:1 to 25:1, 9:1 to 20:1, 10:1 to 17:1, etc., can also be combined together with any of the monovalent salt weight percentage ranges and/or the ionic strength ranges (in any combination) to provide an ink profile that improves color saturation or optical density. Likewise, polymeric binder particle average particle sizes, e.g., 25 nm to 500 nm, from 25 nm to 250 nm, from 25 nm to 100 nm, from 30 nm to 250 nm, from 30 nm to 100 nm, from 40 nm to 250 nm, from 40 nm to 100 nm, or from 50 nm to 100 nm, and concentrations, e.g., 0.5 wt % to 5 wt %, 0.5 wt % to 2 wt %, 1 wt % to 3 wt %, etc., can be adjusted to provide an ink profile that provides good durability while retaining or nearly retaining color saturation or optical density improvements provided by the monovalent salt.

In order to formulate the pigment dispersion into an ink composition, the pigment dispersion, monovalent salt, and polymeric binder particles can be combined with an aqueous liquid vehicle. The liquid vehicle is not particularly limited. The liquid vehicle can include additional polymers, solvents, surfactants, antibacterial agents, UV filters, and/or other additives. In one example, along with other parameters used to determine the crash point and charge stabilization, a lower pigment load may provide for the ability to be more flexible with other parameters, e.g., concentration of dispersant and/or monovalent salt may be lowered with acceptable results. However, higher pigment loads can likewise be used with success as well.

As the liquid vehicle is aqueous, water is one of the major solvents (present at more than 10 wt %, and often more than 30 wt % or even more than 50 wt %), and usually there is one or more organic co-solvent. In some examples, water may be present in an amount representing from about 20 wt % to about 90 wt %, or may be present in an amount representing from about 30 wt % to about 80 wt % of the total ink composition. If an organic co-solvent is added to prepare the pigment dispersion, that co-solvent can be considered when formulating the subsequent ink composition. Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1, 3-propane diol (EPHD), glycerol, N-methylpyrrolidone (NMP), dimethyl sulfoxide, sulfolane, glycol ethers, alkyldiols such as 1,2-hexanediol, and/or ethoxylated glycerols such as LEG-1, etc. The co-solvent can be present in the ink composition from 5 wt % to about 75 wt % of the total ink composition. In one example, the solvent can be present in the ink composition at about 10 wt % to about 50 wt %, or from about 15 wt % to 35 wt %.

The liquid vehicle can also include surfactants. In general the surfactant can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, fluorosurfactants and alcohol ethoxylated surfactants can be used as surfactants. In one example, the surfactant can be Tergitol™ TMN-6, which is available from Dow Chemical Corporation. The surfactant or combinations of surfactants, if present, can be included in the ink composition at from about 0.001 wt % to about 10 wt % and, in some examples, can be present at from about 0.001 wt % to about 5 wt % of the ink compositions. In other examples the surfactant or combinations of surfactants can be present at from about 0.01 wt % to about 3 wt % of the ink compositions.

Consistent with the formulations of this disclosure, various other additives may be employed to provide desired properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Acticide® (Thor Specialties Inc.), Nuosept™ (Nudex, Inc.), Ucarcide™ (Union carbide Corp.), Vancide® (R.T. Vanderbilt Co.), Proxel™ (ICI America), and combinations thereof. Sequestering agents such as EDTA (ethylene diamine tetra acetic acid) may be included to eliminate the deleterious effects of heavy metal impurities and buffer solutions may be used to control the pH of the ink. Viscosity modifiers and buffers may also be present, as well as other additives known to those skilled in the art to modify properties of the ink as desired.

The ink compositions described above are particularly suited to provide good color saturation on non-specialized porous print media (even uncoated paper) but can be suitable for use on any type of substrate of print media. The reason these inks are particularly useful with plain paper is that color saturation is diminished fairly significantly as colorant and liquid vehicle is soaked into the media substrate. This problem is enhanced when the charge stabilization of the pigment is too high. Pigment formulators tend to stabilize inks with high charges, but as discussed herein, such high charge stabilization may not be the best choice for plain paper when trying to enhance saturation. Adding the right, relatively low, concentration of a monovalent salt and polymeric binder particles as described herein can provide higher saturation and durability as the pigment crashes on the paper when liquid vehicle becomes absorbed into the paper fibers.

Suitable examples of porous media substrates that can be used include, but are not limited to, cellulose based paper, fiber based paper, inkjet paper, standard office paper, swellable media, microporous media, photobase media, offset media, coated media, uncoated media, fabrics, or woven substrate. That being described, notably, these inks work surprisingly well on plain paper substrates as described herein.

Figure 3:
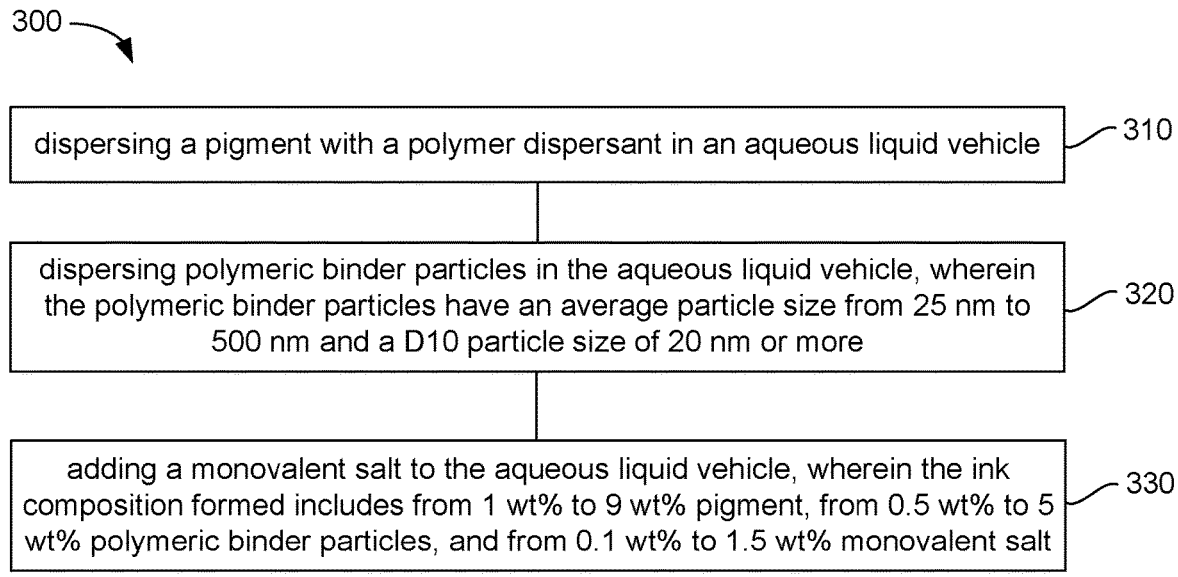
FIG. 3 depicts a flow chart of an example method of preparing an ink composition in accordance with the present disclosure.

In another example, the various details described herein related to the ink composition can be relevant to various methods. In one example, as shown at FIG. 3, a method 300 of preparing an ink composition can include dispersing 310 a pigment with a polymer dispersant in an aqueous liquid vehicle, and dispersing 320 polymeric binder particles in the aqueous liquid vehicle. The polymeric binder particles can have an average particle size from 25 nm to 500 nm and a D10 particle size of 20 nm or more. The method can also include adding 330 a monovalent salt to the aqueous liquid vehicle. Thus, when the ink composition is formed it can include from 1 wt % to 9 wt % pigment, from 0.5 wt % to 5 wt % polymeric binder particles, and from 0.1 wt % to 1.5 wt % monovalent salt.

Figure 4:
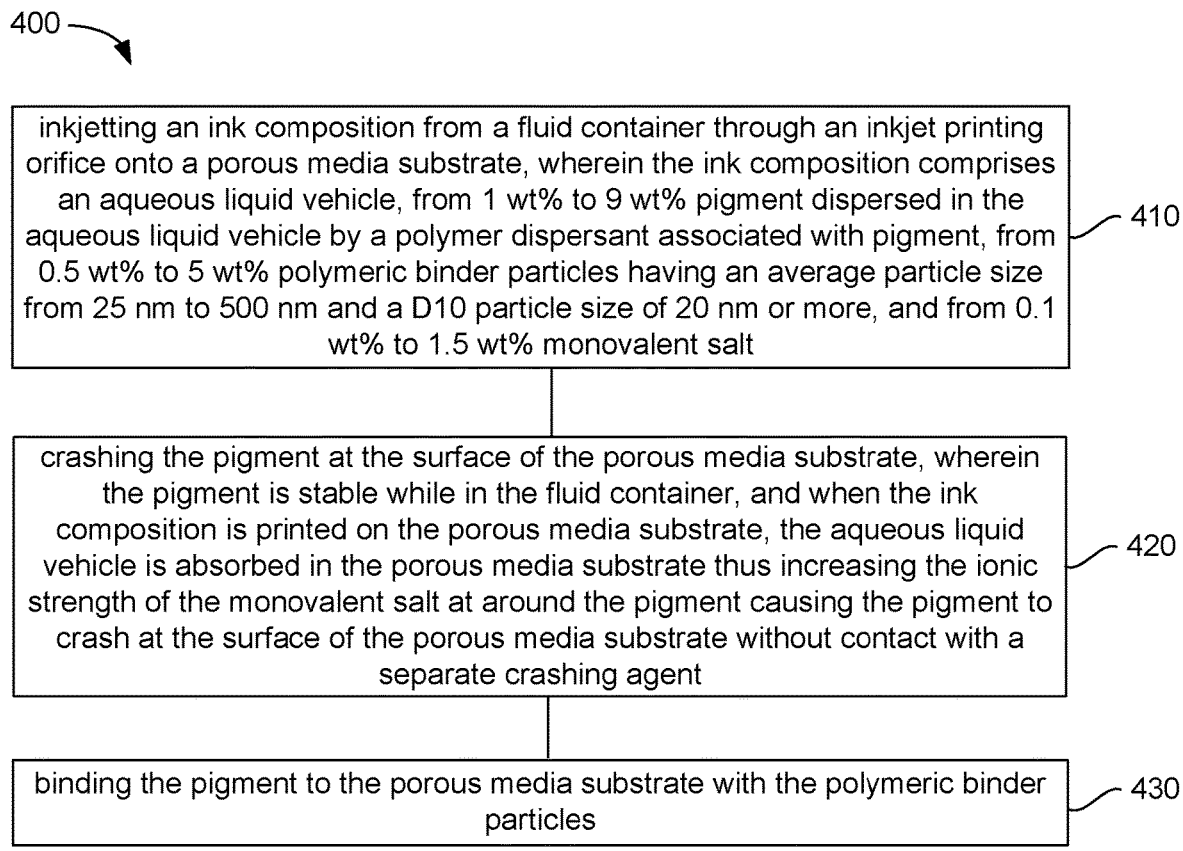
FIG. 4 depicts a flow chart of an example method of printing in accordance with the present disclosure.

In another example, as shown in FIG. 4, a method of printing 400 can include inkjetting 410 an ink composition from a fluid container through an inkjet printing orifice onto a porous media substrate. The ink composition can include an aqueous liquid vehicle, from 1 wt % to 9 wt % pigment dispersed in the aqueous liquid vehicle by a polymer dispersant associated with pigment, from 0.5 wt % to 5 wt % polymeric binder particles having an average particle size from 25 nm to 500 nm and a D10 particle size of 20 nm or more, and from 0.1 wt % to 1.5 wt % monovalent salt. The method can further include crashing 420 the pigment at a surface of the porous media substrate. Thus, pigment can be stable while in the fluid container, and when the ink composition is printed on the porous media substrate, the aqueous liquid vehicle can be absorbed in the porous media substrate, thus increasing the ionic strength of the monovalent salt around the pigment (or in vicinity of the pigment particle), e.g., at a surface of the porous media substrate. This can cause the pigment to crash at the surface of the porous media substrate without contact with a separate crashing agent. Another step can include binding 430 the pigment particles to a surface of the porous media substrate using the polymeric binder particles.

It is noted that, as used in this specification and the appended claims, the singular forms "a," "an," and "the" include plural referents unless the content clearly dictates otherwise.

As used herein "aqueous liquid vehicle" or "liquid vehicle" refers to a water-containing liquid medium in which the pigment, polymeric dispersant, and monovalent salt are admixed in to form an ink composition. In addition to water, the aqueous liquid vehicle can include several components including but not limited to organic co-solvents, surfactants, biocides, UN filters, preservatives, and other additives.

When referring to a "polymer dispersant" herein, this refers to a separate additive that is included with the pigment to disperse the pigment. The polymer dispersant can be adsorbed or attracted to the surface of the pigment, but is not covalently attached as is the case with self-dispersed pigments. The polymeric dispersant is separate and distinct from the polymeric binder particles described herein.

Color "saturation" refers to the intensity of color, expressed by the degree from which it differs from white. It can be expressed as C/L*. Notably, saturation relates to color. However, in accordance with examples of the present disclosure, when a black pigment is used, optical density (OD) rather than color saturation can be used to describe the increased intensity. Thus, examples and discussion herein related to color saturation may also be relevant to optical density with respect to black pigment. Thus, any disclosure related to color saturation should be read to include black optical density (for black inks), whether explicitly stated so in a specific context or not.

Converting molar concentration to weight percent includes taking into account the molecular weight of the monovalent salt and the density of the liquid ink. Typically, the density of the ink can be from about 1.04 g/cm$^3$ to about 1.12 g/cm$^3$, or from about 1.06 g/cm$^3$ to about 1.1 g/cm$^3$, or so, depending on the ink formulation.

Notably, there may be some added ingredients that may include some incidental concentrations of monovalent salt that are inherently in the formulation of the additive. This monovalent salt is not calculated when determining the molar concentration of the added monovalent salt unless the salt that is already present in an additive is identical to the salt being added to increase the ionic strength.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also individual weights such as 2 wt %, 11 wt %, 14 wt %, and sub-ranges such as 10 wt % to 20 wt %, 5 wt % to 15 wt %, etc.

When referring to an increase or improvement in performance, the increase or improvement is based on printing using Hammermill Great White 30% Recycled Media as the print medium which was available at the time of filing of the disclosure in the United States Patent and Trademark Office.

EXAMPLES

The following examples illustrate the technology of the present disclosure. However, it is to be understood that the following is only exemplary or illustrative of the application of the principles of the presented formulations and methods. Numerous modifications and alternative methods may be devised by those skilled in the art without departing from the spirit and scope of the present disclosure. The appended claims are intended to cover such modifications and arrangements. Thus, while the technology has been described above with particularity, the following provide further detail in connection with what are presently deemed to be certain acceptable examples.

Example 1

Figure 5:
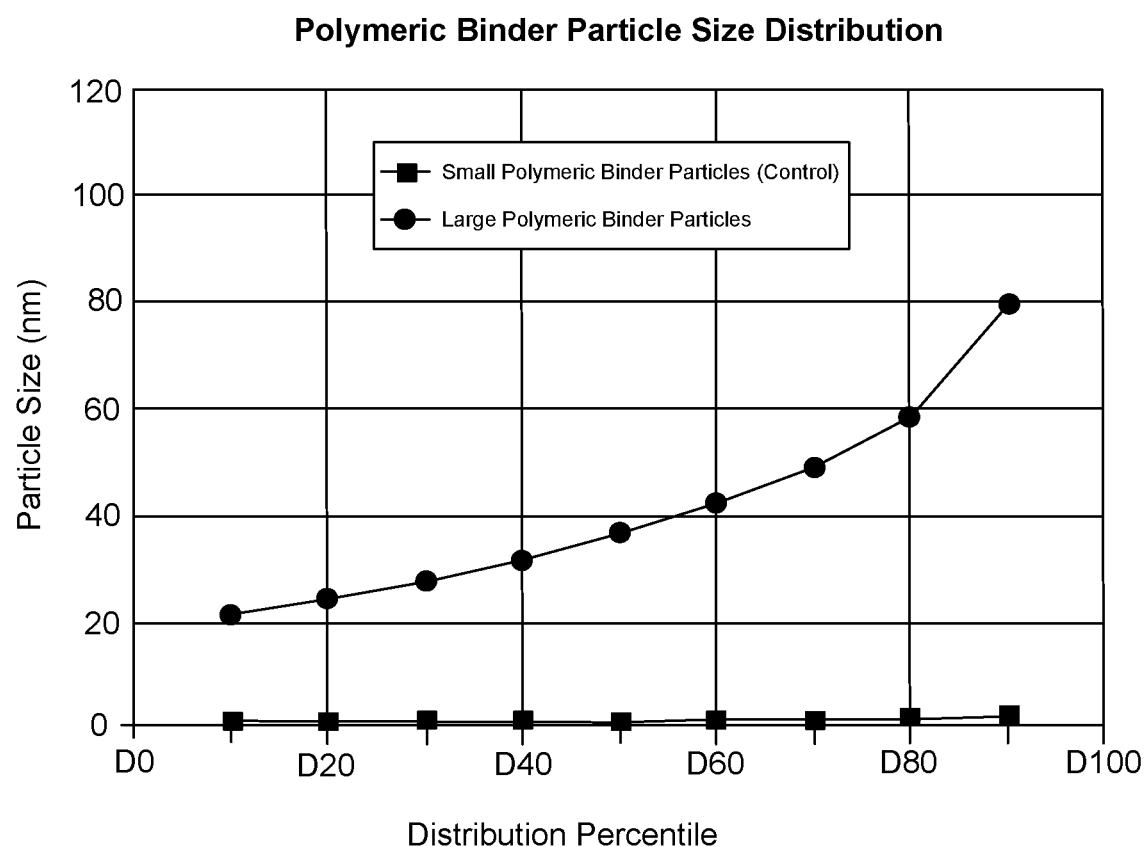
FIG. 5 provides an example graph comparing the particle size distribution of small polymeric binder particles vs. large polymeric binder particles in accordance with examples of the present disclosure.

Preparation of Ink Compositions with Pigment Dispersions, Monovalent Salt, and Polymeric Binder Particles Three pigment dispersions formulated with cyan, magenta, and yellow pigments, respectively, and dispersed with a separate polymer dispersant were formulated into nine different inkjet ink compositions (three cyan, three magenta, and three yellow). For each color, a first ink was prepared without polymeric binder particles to provide a color saturation baseline, a second ink was prepared with small polymeric binder particles (D10=1 nm; D50=1.24 nm; D90=2.21 nm; and the number average particle size was Mn=1.050 nm), and a third ink was prepared with large polymeric binder particles (D10=21.45 nm; D50=36.3 nm; D90=79.1 nm; and the number average particle size was Mn=26.09 nm). The particle weight distributions for the two different polymeric binder particles are shown in more detail in FIG. 5. The distributions were determined using Dynamic Light Scattering (DLS) which detects Brownian motion of the particles in a solvent. Specifically, Nanotrac Wave was utilized to perform these measurements. The polymers were measured as-is without dilution for a scan rate of one minute at three total data acquisitions.

All of the inkjet inks included a monovalent salt (potassium chloride) which was added at a small concentration to enhance the saturation of the various pigments when printed on porous media, namely two different types of plain paper, e.g., Staples Copy Media and Hammermill Great White 30% recycled office paper (GW30). The nine ink formulations, three for each color, are shown below in Tables 1-3, as follows:

TABLE 1

Cyan Inks

| Ingredient | Class | Cyan 1 | Cyan 2 | Cyan 3 |
| --- | --- | --- | --- | --- |
| 2-Pyrrolidinone | Solvent | 9 | 9 | 9 |
| EHPD | Solvent | 10 | 10 | 10 |
| Glycerol | Solvent | 4 | 4 | 4 |
| LEG-1 | Solvent | 0.75 | 0.75 | 0.75 |
| Tergitol ® TMN6 | Surfactant | 0.72 | 0.72 | 0.72 |
| Acticide ® B20 | Biocide | 0.16 | 0.16 | 0.16 |
| Acticide ® M20 | Biocide | 0.07 | 0.07 | 0.07 |
| Potassium Chloride | Monovalent Salt | 0.6 | 0.60 | 0.6 |
| Urethane-Acrylate Polymer | Small Polymeric Binder Particles | — | 1 | — |
| Urethane-Acrylate Polymer | Large Polymeric Binder Particles | — | — | 1 |
| Cyan Pigment | Styrene-acrylic Dispersed Pigment | 6 | 6 | 6 |

Tergitol ® is available from Sigma Aldrich; and Acticide ® is available from Thor Group Limited.

TABLE 2

Magenta Inks

| Ingredient | Class | Magenta 1 | Magenta 2 | Magenta 3 |
| --- | --- | --- | --- | --- |
| 2-Pyrrolidinone | Solvent | 9 | 9 | 9 |
| EHPD | Solvent | 10 | 10 | 10 |
| Glycerol | Solvent | 4 | 4 | 4 |
| LEG-1 | Solvent | 0.75 | 0.75 | 0.75 |
| Tergitol ® TMN6 | Surfactant | 0.72 | 0.72 | 0.72 |
| Acticide ® B20 | Biocide | 0.16 | 0.16 | 0.16 |
| Acticide ® M20 | Biocide | 0.07 | 0.07 | 0.07 |
| Potassium Chloride | Monovalent Salt | 0.6 | 0.60 | 0.6 |
| Urethane-Acrylate Polymer | Small Polymeric Binder Particles | — | 2 | — |
| Urethane-Acrylate Polymer | Large Polymeric Binder Particles | — | — | 2 |
| Magenta Pigment 1 | Styrene-acrylic Dispersed Pigment | 3 | 3 | 3 |
| Magenta Pigment 2 | Styrene-acrylic Dispersed Pigment | 3 | 3 | 3 |

Tergitol ® is available from Sigma Aldrich; and Acticide ® is available from Thor Group Limited.

TABLE 3

Yellow Inks

| Ingredient | Class | Yellow 1 | Yellow 2 | Yellow 3 |
| --- | --- | --- | --- | --- |
| 2-Pyrrolidinone | Solvent | 9 | 9 | 9 |
| EHPD | Solvent | 10 | 10 | 10 |
| Glycerol | Solvent | 4 | 4 | 4 |
| LEG-1 | Solvent | 0.75 | 0.75 | 0.75 |
| Tergitol ® TMN6 | Surfactant | 0.72 | 0.72 | 0.72 |
| Acticide ® B20 | Biocide | 0.16 | 0.16 | 0.16 |
| Acticide ® M20 | Biocide | 0.07 | 0.07 | 0.07 |
| Potassium Chloride | Monovalent Salt | 0.6 | 0.60 | 0.6 |
| Urethane-Acrylate Polymer | Small Polymeric Binder Particles | — | 1 | — |
| Urethane-Acrylate Polymer | Large Polymeric Binder Particles | — | — | 1 |
| Yellow Pigment | Styrene-acrylic Dispersed Pigment | 6 | 6 | 6 |

Tergitol ® is available from Sigma Aldrich; and Acticide ® is available from Thor Group Limited.

Example 2

Saturation on Two Different Types of Plain Paper

The nine ink compositions shown in Tables 1-3 were used to generate red, green, and blue printed samples. Red, Green, and Blue samples can be prepared by admixing 2 of the inks of Tables 1-3 together at appropriate proportions to generate a red, green, or blue image sample. To retain the basic character of each printed sample, Cyan 1, Magenta 1, and Yellow 1 were printed at various mixture ratios to generate red, green, and blue samples that were devoid of polymeric binder particles. Cyan 2, Magenta 2, and Yellow 2 were printed at various ratio concentrations to generate red, green, and blue samples that included small polymeric binder particles (D10=1 nm; D50=1.24 nm; D90=2.21 nm; and the number average particle size was Mn=1.05 nm). Cyan 3, Magenta 3, and Yellow 3 were printed at various ratio concentrations to generate red, green, and blue samples that included large polymeric binder particles (D10=21.45 nm; D50=36.3 nm; D90=79.1 nm; and the number average particle size was Mn=26.09 nm). To illustrate, a red printed image can be formed by combining a magenta pigment and a yellow pigment to arrive at a hue angle of 25; a green printed image can be formed by combining a yellow pigment and a cyan pigment to arrive at a hue angle of 150; and a blue printed image can be formed by combining cyan pigment and magenta pigment to arrive at a hue angle of 265.

Figure 6:
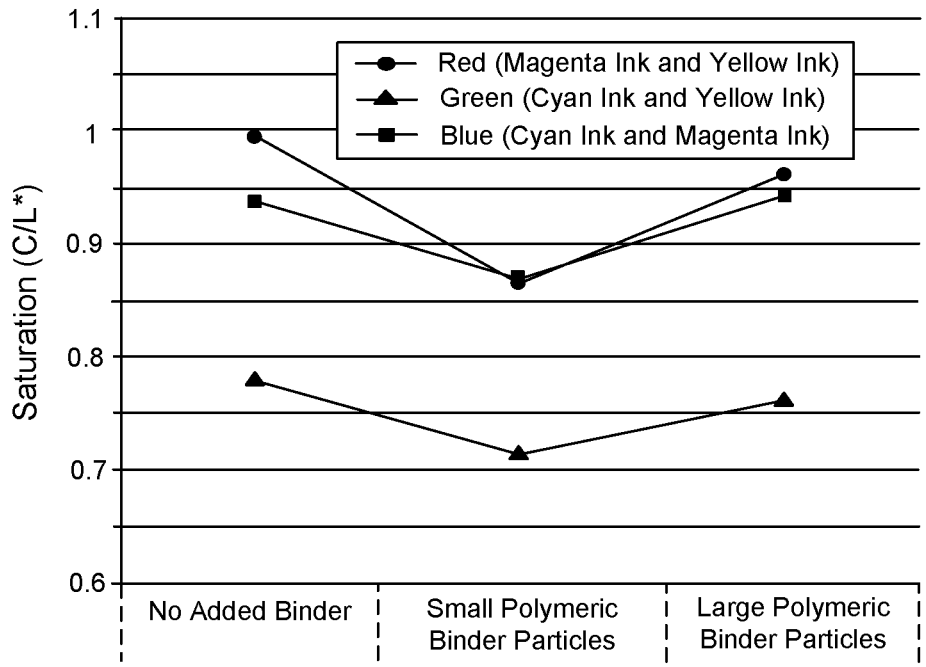
FIG. 6 provides an example graph comparing saturation on a first type of plain paper using inks with pigment and monovalent salt, where a first ink is devoid of polymeric binder particles, a second ink includes small polymeric binder particles, and a third ink includes large polymeric binder particles in accordance with examples of the present disclosure.
Figure 7:
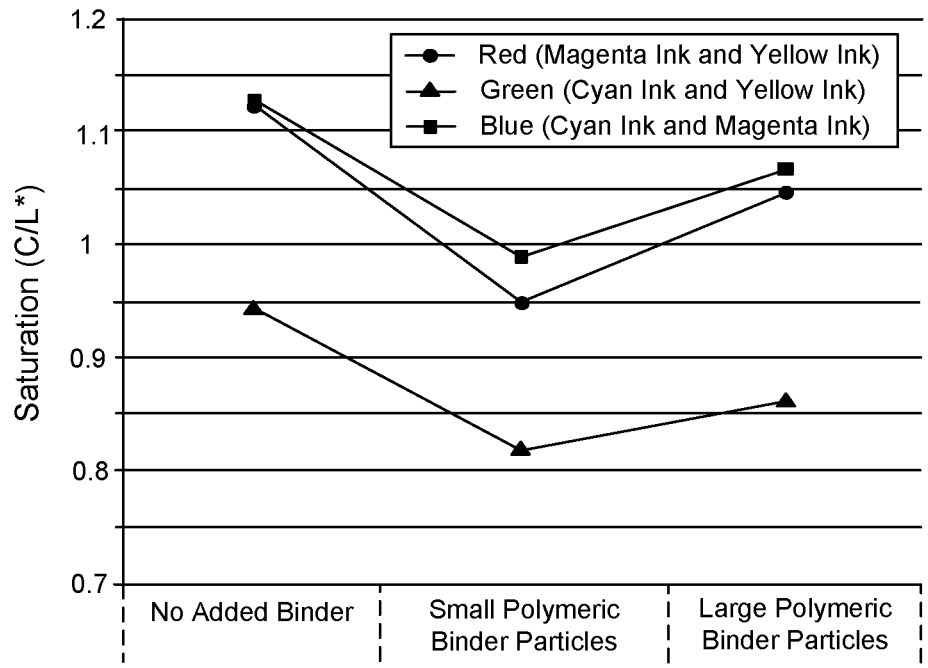
FIG. 7 provides an alternative example graph comparing saturation on a second type of plain paper using inks with pigment and monovalent salt, where a first ink is devoid of polymeric binder particles, a second ink includes small polymeric binder particles, and a third ink includes large polymeric binder particles in accordance with examples of the present disclosure.

Regardless of the color tested, as can be seen from the data presented in FIGS. 6 and 7, excellent color saturation was achieved by combining the pigment and a small amount of potassium chloride in an ink composition. See saturation data in FIGS. 6 and 7 labeled "No Added Binder." These samples were printed utilizing inks labeled Cyan 1, Magenta 1, and Yellow 1 from Tables 1-3. However, the color saturation was significantly reduced when the small polymeric binder particles were added in an attempt to improve durability. See saturation data in FIGS. 6 and 7 labeled "Small Polymeric Binder Particles." These samples were printed utilizing inks labeled Cyan 2, Magenta 2, and Yellow 2 from Tables 1-3. Surprisingly, when larger polymeric binder particles were added (which also improve durability), the color saturation was only minimally diminished in every case, and with one ink sample on Staples Copy Media, the blue printed sample saturation was actually marginally improved. See saturation data in FIGS. 6 and 7 labeled "Large Polymeric Binder Particles." These samples were printed utilizing inks labeled Cyan 3, Magenta 3, and Yellow 3 from Tables 1-3. Though each primary ink color was not specifically tested (Cyan, Magenta, and Yellow), it is expected that these inks would perform similarly when printed alone. Furthermore, though black inks were not tested, it is expected that the optical density of a black ink would also be retained more closely with larger polymeric polymer particles compared to smaller particles.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An ink composition, comprising:
   an aqueous liquid vehicle;
   from 1 wt % to 9 wt % pigment dispersed in the aqueous liquid vehicle by a polymer dispersant associated with pigment;
   from 0.5 wt % to 5 wt % polymeric binder particles having a D50 particle size from 40 nm to 350 nm and a D10 particle size of 20 nm to 200 nm; and
   from 0.1 wt % to 1.5 wt % monovalent salt;
   wherein the polymeric binder particles and the pigment have an average particle size ratio from 0.75:1 to 1.5:1.

2. The ink composition of claim 1, wherein the particle count of polymeric binder particles that are greater than 500 nm is less than 100,000,000 particles per mL, of the ink composition.

3. The ink composition of claim 1, wherein the polymeric binder particles and the pigment have an average particle size ratio from 0.75:1 to 1.2:1.

4. The ink composition of claim 1, wherein the pigment is cyan, magenta or yellow, and the polymeric binder particles are present in the ink composition at from 0.5 wt % to 3 wt %.

5. The ink composition of claim 1, wherein the pigment is black and the polymeric binder particles are present in the ink composition at from 0.75 wt % to 2.5 wt %.

6. The ink composition of claim 1, wherein the pigment to monovalent salt weight ratio in the ink composition is from 5:1 to 25:1.

7. The ink composition of claim 1, wherein the pigment is present at from 4.5 wt % to 8 wt %, the polymeric binder particles are present at from 0.5 wt % to 3 wt %, and the monovalent salt concentration is from 0.3 wt % to 0.8 wt %.

8. The ink composition of claim 1, wherein the polymeric binder particles include polyurethane, styrene acrylate, urethane acrylate, or a combination thereof.

9. The ink composition of claim 1, wherein the pigment has a crash point at from 0.06 M to 0.3 M of the monovalent salt in the ink composition, wherein the monovalent salt is present at from 30% to 95% molar concentration of the crash point.

10. The ink composition of claim 1, wherein the pigment remains stable while in an inkjet fluid container, and wherein when the ink composition is printed on a porous media substrate, aqueous liquid vehicle is absorbed into the porous media substrate thus increasing the ionic strength of the monovalent salt around the pigment causing the pigment to crash at the surface of the porous media substrate and the polymeric binder particles to bind the pigment to the porous media substrate.

11. A method of preparing an ink composition, comprising:
    dispersing a pigment with a polymer dispersant in an aqueous liquid vehicle;
    dispersing polymeric binder particles in the aqueous liquid vehicle, wherein the polymeric binder particles have a D50 particle size from 40 nm to 350 nm and a D10 particle size of 20 nm to 200 nm; and
    adding a monovalent salt to the aqueous liquid vehicle, wherein the ink composition formed includes from 1 wt % to 9 wt % pigment, from 0.5 wt % to 5 wt % polymeric binder particles, and from 0.1 wt % to 1.5 wt % monovalent salt;
    wherein the polymeric binder particles and the pigment have an average particle size ratio from 0.75:1 to 1.5:1.

12. The method of claim 11, wherein the particle count of polymeric binder particles greater than 500 nm is less than 100,000,000 particles per mL of the ink composition.

13. The method of claim 11, wherein the polymeric binder particles and the pigment have an average particle size ratio from 0.75:1 to 1.2:1.

14. A method of printing, comprising:
    inkjetting an ink composition from a fluid container through an inkjet printing orifice onto a porous media substrate, wherein the ink composition comprises an aqueous liquid vehicle, from 1 wt % to 9 wt % pigment dispersed in the aqueous liquid vehicle by a polymer dispersant associated with pigment, from 0.5 wt % to 5 wt % polymeric binder particles having a D50 particle size of from 40 nm to 350 nm and a D10 particle size of 20 nm to 200 nm, and from 0.1 wt % to 1.5 wt % monovalent salt, wherein the polymeric binder particles and the pigment have an average particle size ratio from 0:75:1 to 1.5:1;
    crashing the pigment at the surface of the porous media substrate, wherein the pigment is stable while in the fluid container, and when the ink composition is printed on the porous media substrate, the aqueous liquid vehicle is absorbed in the porous media substrate thus increasing the ionic strength of the monovalent salt around the pigment causing the pigment to crash at the surface of the porous media substrate without contact with a separate crashing agent; and binding the pigment to the porous media substrate with the polymeric binder particles.

15. The method of claim 14, wherein the particle count of polymeric binder particles greater than 500 nm is less than 100,000,000 particles per mL of the ink composition, and wherein the polymeric binder particles and the pigment have an average particle size ratio from 0.75:1 to 1.2:1.

16. The method of claim 14, wherein the porous media substrate is non-ColorLok print media or plain paper.

17. The ink composition of claim 1, wherein the polymer binder particles have an average particle size that is larger than an average particle size of the pigment.

18. The ink composition of claim 1, wherein the monovalent salt is $NH_4F$, $NH_4Cl$, $NH_4NO_3$, $(NH_4)_2SO_4$, $(NH_4)_3PO_4$, LiF, NaF, KF, RbF, CsF, LiCl, KCl, NaCl, CsCl, RbCl, LiBr, CsBr, RbBr, KBr, NaBr, $NH_4Br$, LiI, NaI, KI, RbI, CsI, $NaNO_3$, $KNO_3$, $LiNO_3$, $RbNO_3$, $CsNO_3$, $KNO_3$, $Li_2SO_4$, $Na_2SO_4$, $K_2SO_4$, $Cs_2SO_4$, $Rb_2SO_4$, $Li_3PO_4$, $Na_3PO_4$, $K_3PO_4$, $Rb_3PO_4$, $Cs_3PO_4$, $Li_3PO_4$, monosodium citrate, disodium citrate, trisodium citrate, potassium citrate, rubidium citrate, cesium citrate, lithium citrate, sodium ascorbate, potassium ascorbate, lithium ascorbate, lithium acetate, sodium acetate, potassium acetate, cesium acetate, rubidium acetate, monosodium glutamate, or potassium glutamate.

* * * * *